United States Patent [19]
Naganuma et al.

[11] Patent Number: 5,824,753
[45] Date of Patent: Oct. 20, 1998

[54] PROCESS FOR PRODUCING A STYRENIC POLYMER

[75] Inventors: Shoji Naganuma; Norio Tomotsu, both of Ichihara, Japan

[73] Assignee: Idemitsu Kosan Co., Ltd., Tokyo, Japan

[21] Appl. No.: 750,844

[22] PCT Filed: May 2, 1996

[86] PCT No.: PCT/JP96/01205

§ 371 Date: Dec. 24, 1996

§ 102(e) Date: Dec. 24, 1996

[87] PCT Pub. No.: WO96/34894

PCT Pub. Date: Nov. 7, 1996

[30] Foreign Application Priority Data

May 2, 1995 [JP] Japan .................................... 7-108358

[51] Int. Cl.$^6$ ................. C08F 2/38; C08F 4/642
[52] U.S. Cl. ................ 526/82; 526/133; 526/153; 526/160; 526/346; 526/905
[58] Field of Search ..................... 526/160, 153, 526/170, 905, 78, 82, 65, 88, 133

[56] References Cited

U.S. PATENT DOCUMENTS

| | | | |
|---|---|---|---|
| 3,051,690 | 8/1962 | Vandenburg | 526/347 X |
| 4,990,580 | 2/1991 | Ishihara et al. | 526/905 X |
| 5,451,648 | 9/1995 | Ikeuchi et al. | 526/905 X |
| 5,468,818 | 11/1995 | Newman et al. | 526/905 X |
| 5,484,862 | 1/1996 | Siddall et al. | 526/160 X |
| 5,597,879 | 1/1997 | Ase et al. | 526/347.2 X |

*Primary Examiner*—Fred Teskin
*Attorney, Agent, or Firm*—Oblon, Spivak, McClelland, Maier & Neustadt, P.C.

[57] ABSTRACT

A process for producing a styrenic polymer having the syndiotactic configuration which process comprises a plurality of polymerization stages, at least one polymerization stage selected as desired from the plurality of polymerization stages being a polymerization stage in which hydrogen is introduced; in accordance with the present invention, efficient control of molecular weight and molecular weight distribution is enabled. By increasing activity of the polymerization catalyst, the amount of the catalyst and the amount of residual metals can be decreased, and the cost of production can be decreased.

3 Claims, No Drawings

PROCESS FOR PRODUCING A STYRENIC POLYMER

TECHNICAL FIELD

The present invention relates to a process for producing a styrenic polymer. More particularly, the present invention relates to a process for producing a styrenic polymer having the syndiotactic configuration which enables decrease in the amount of the catalyst, decrease in the amount of residual metals, and decrease in the cost of production.

BACKGROUND ART

Recently, a process for producing a styrenic polymer having the syndiotactic configuration (hereinafter, this polymer is occasionally referred to as SPS) by using a catalyst comprising a transition metal compound, particularly a titanium compound, and an alkylaluminoxane as the main components thereof has been proposed (the specifications of Japanese Patent Application Laid-Open No. Showa 62(1987)-187708, and other related applications).

In order to produce a styrenic polymer having the syndiotactic configuration efficiently in the above process without using the alkylaluminoxane which is expensive and used in a large amount, a process using a coordinated complex compound comprising an anion having a plurality of groups bonded to a metal and a cation has also been proposed (the specifications of Japanese Patent Application Laid-Open Nos. Heisei 2(1990)-415573 and Heisei 2(1990)-415574).

In the above process of polymerizing a styrenic monomer by using a transition metal and an aluminoxane, introduction of hydrogen into the polymerization system as the agent for molecular weight control has been proposed in order to control the molecular weight (the specification of Japanese Patent Application Laid-Open No. Showa 63(1988)-179906).

However, when a coordinated complex compound comprising an anion having a plurality of groups bonded to a metal and a cation is used in place of an aluminoxane because the aluminoxane is expensive and causes a low yield, the polymerization temperature is increased or an alkylaluminum is added in a large amount as an agent for molecular weight control. This causes drawbacks in that the yield of the obtained SPS is decreased and that the amount of residual metals is increased.

When the molecular weight distribution is controlled by increasing the temperature during the polymerization, drawbacks are found in that the yield of SPS is decreased and that the cost of the catalyst is increased.

In the specification of Japanese Patent Application Laid-Open No. Heisei 3(1991)-119006, a process in which a plurality of titanium catalysts are used has been disclosed. In the specification of Japanese Patent Application Laid-Open No. Heisei 6(1994)-116328, a process in which two different types of cocatalyst component and an organoaluminum component are added has been disclosed. However, the processes disclosed in the above specifications have drawbacks in that two or more types of transition metal complex compound are required and that the amount of residual aluminum is increased, and it is difficult that the molecular weight distribution is efficiently controlled by these processes.

DISCLOSURE OF THE INVENTION

As the result of the extensive studies conducted by the present inventors under the above circumstances to enable the efficient control of the molecular weight and the molecular weight distribution and to decrease the cost of production in the process for producing the styrenic polymer, it has been discovered that the amount of the catalyst and the amount of residual metals are decreased and the cost of production is also decreased by increasing the activity of the catalyst and that the molecular weight distribution can be controlled by adding hydrogen after the polymerization of styrene has started or by changing the amount of supplied hydrogen. The present invention has been completed on the basis of the discovery.

Accordingly, the present invention provides a process for producing a styrenic polymer having the syndiotactic configuration which process comprises a plurality of polymerization stages, at least one polymerization stage selected as desired from the plurality of polymerization stages being a polymerization stage in which hydrogen is introduced.

THE MOST PREFERRED EMBODIMENT TO CARRY OUT THE INVENTION

The present invention is described in more detail in the following.

In the process of the present invention, a styrenic monomer is homopolymerized or copolymerized in the presence of a polymerization catalyst comprising, as the main components thereof, (a) a transition metal compound, (b) a coordinated complex compound comprising a cation and an anion having a plurality of groups bonded to a metal or an oxygen-containing compound, such as an aluminoxane and the like, and (c) a compound containing alkyl groups which is used where necessary. In the polymerization, any of component (a), component (b), and component (c) may be added first to the monomer. It is also possible that these catalyst components are added to the monomer after they have been brought into reaction to each other.

The catalyst used in the present invention is described in the following.

In the present invention, a styrenic monomer is polymerized in the presence of the catalyst comprising (a) the transition metal and (b) the above coordinated complex compound or the like as the main components thereof. As the transition metal of component (a) of the catalyst, various compounds can be used, and compounds of metals of Group 3 to 6 and lanthanoid metals of the Periodic Table are generally used. Among these compounds, compounds of metals of Group 4 (such as titanium, hafnium, zirconium, vanadium, and the like) are preferable. As the titanium compound, various compounds can be used. Examples of the titanium compound include at least one compound selected from titanium compounds and chelate compounds of titanium represented by general formula (I):

$$TiR^1_a R^2_b R^3_c R^4_{4-(a+b+c)} \qquad (I)$$

or general formula (II):

$$TiR^1_a R^2_e R^3_{3-(d+e)} \qquad (II)$$

[wherein $R^1$, $R^2$, $R^3$, and $R^4$ represent each hydrogen atom, an alkyl group having 1 to 20 carbon atoms, an alkoxy group having 1 to 20 carbon atoms, an alkylamino group or an alkylamide group having 1 to 20 carbon atoms, an aryl group, an alkylaryl group, or an arylalkyl group having 6 to 20 carbon atoms, an acyloxy group having 1 to 20 carbon atoms, cyclopentadienyl group, a substituted cyclopentadienyl group, indenyl group, a halogen atom, a group containing an element of Group 15 of the Periodic Table (N, P, As, Sb, or Bi), or a group containing silicon (Si) or boron (B); a, b, and c represent each an integer of 0 to 4, and d and e represent each an integer of 0 to 3].

$R^1$, $R^2$, $R^3$, and $R^4$ in general formulae (I) and (II) represent each hydrogen atom, an alkyl group having 1 to 20 carbon atoms (specifically, methyl group, ethyl group, propyl group, butyl group, amyl group, isoamyl group, isobutyl group, octyl group, 2-ethylhexyl group, or the like), an alkoxy group having 1 to 20 carbon atoms (specifically, methoxy group, ethoxy group, propoxy group, butoxy group, amyloxy group, hexyloxy group, 2-ethylhexyloxy group, or the like), an aryl group, an alkylaryl group, or an arylalkyl group having 6 to 20 carbon atoms (specifically, phenyl group, tolyl group, xylyl group, benzyl group, or the like), an acyloxy group having 1 to 20 carbon atoms (specifically, heptadecylcarbonyloxy group or the like), cyclopentadienyl group, a substituted cyclopentadienyl group (specifically, methylcyclopentadienyl group, 1,3-dimethylcyclopentadienyl group, pentamethylcyclopentadienyl group, or the like), indenyl group, or a halogen atom (specifically, chlorine, bromine, iodine, or fluorine). $R^1$, $R^2$, $R^3$, and R4 described above may be the same with each other or different from each other. a, b, and c represent each an integer of 0 to 4, and d and e represent each an integer of 0 to 3.

More preferable examples of the titanium compound include titanium compounds represented by general formula (III):

TiRXYZ (III)

[wherein R represents cyclopentadienyl group, a substituted cyclopentadienyl group, or indenyl group, and X, Y, and Z represent each independently hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms, or a halogen atom]. Examples of the substituted cyclopentadienyl group represented by R in the above formula include cyclopentadienyl groups substituted with one or more alkyl groups having 1 to 6 carbon atoms, which are more specifically methylcyclopentadienyl group, 1,3-dimethylcyclopentadienyl group, 1,2,4-trimethylcyclopentadienyl group, 1,2,3,4-tetermethylcyclopentadienyl group, pentamethylcyclopentadienyl group, and the like. X, Y, and Z represent each independently hydrogen atom, an alkyl group having 1 to 12 carbon atoms (specifically, methyl group, ethyl group, propyl group, n-butyl group, isobutyl group, amyl group, isoamyl group, octyl group, 2-ethylhexyl group, or the like), an alkoxy group having 1 to 12 carbon atoms (specifically, methoxy group, ethoxy group, propoxy group, butoxy group, amyloxy group, hexyloxy group, octyloxy group, 2-ethylhexyloxy group, or the like), an aryl group having 6 to 20 carbon atoms (specifically, phenyl group, naphthyl group, or the like), an aryloxy group having 6 to 20 carbon atoms (specifically, phenoxy group or the like), an arylalkyl group having 6 to 20 carbon atoms (specifically, benzyl group or the like), a halogen atom (specifically, chlorine, bromine, iodine, or fluorine), a group containing an element of Group 15 of the Periodic Table (N, P, As, Sb, or Bi) (specifically amino group, amide group, or the like), or a group containing silicon (specifically, trimethylsilyl group or the like).

Specific examples of the titanium compound represented by general formula (III) include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,3-dimethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium phenoxide, cyclopentadienyltitanium trichloride, pentamethylcyclopentadienyltitanium trichlorde, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienyltribenzyltitanium, pnetamethylcyclopentadienylmethyldiethoxytitanium, indenyltitanium trichloride, indenyltitanium trimethoxide, indenyltitanium triethoxide, indenyltrimethyltitanium, indenyltribenzyltitanium, (cyclopentadienyl)(dimethylamido)titanium dichloride, (cyclopentadienyl)(dimethylamido)titanium dimethyl, (cyclopentadienyl)(dimethylamido)titanium dimethoxide, (methylcyclopentadienyl)(dimethylamido)titanium dichloride, (methylcyclopentadienyl)(diethylamido)titanium dichloride, (methylcyclopentadienyl)(diphenylamido)titanium dichloride, (methylcyclopentadienyl)(methylphenylamido)titanium dichloride, (methylcyclopentadienyl)(dimethylamido)titanium dimethyl, (methylcyclopentadienyl)(dimethylamido)titanium dimethoxide, (tetramethylcyclopentadienyl)(dimethylamido)titanium dichloride, (tetramethylcyclopentadienyl)(dimethylamido)titanium dichloride, (tetramethylcyclopentadienyl)(dietheylamido)titanium dichloride, (tetramethylcyclopentadienyl)(methylphenylamido)titanium dichloride, (tetramethylcyclopentadienyl)(dimethylamido)titanium dimethyl, (tetramethylcylcopentadienyl)(dimethylamido)titanium dimethoxide, (pentamethylcyclopentadienyl)(dimethyamido)titanium dichloride, (pentamethylcyclopentadienyl)(diethyamido)titanium dichloride, (pentamethylcyclopentadienyl)(diphenylamido)titanium dichloride, (pentamethylcyclopentadienyl)(methylphenylamido)titanium dichloride, (pentamethylcyclopentadienyl)(dimethylamido)titanium dimethyl, (pentamethylcyclopentadienyl)(dimethylamido)titanium dimethoxide, (pentamethylcyclopentadienyl)(bisdimethylamido)titanium chloride, (pentamethylcyclopentadienyl)(bisdimethylamido)methyltitanium, (pentamethylcyclopentadienyl)(bisdimethylamido)titanium methoxide, (1,2,3-trimethylindenyl)(dimethylamido)titanium dichloride, (1,2, 3-trimethylindenyl)(dimethylamido)titanium dimethyl, (1,2,3-trimethylindenyl)(dimethylamido)titanium dimethoxide, (1,2,3-trimethyl-4,5,6,7-tetrahydroindenyl)(dimethylamido) titanium dichloride, (1,2,3-trimethyl-4,5,6,7-tetrahydroindenyl)(dimethylamido)titanium dimethyl, (1,2,3-trimethyl-4,5,6,7-tetrahydroindenyl)(dimethylamido) titanium dimethoxide, (1,2-dimethyl-4,5,6,7-tetrahydroindecyl)(dimethylamido)titanium dichloride, (1,2-dimethyl-4,5,6,7-tetrahydroindenyl)(dimethylamido) titanium dimethyl, (1,2-dimethyl-4,5,6,7-tetrahydroindenyl) (dimethylamido)titanium dimethoxide, and the like.

Among these titanium compounds, compounds containing no halogen atom are preferable, and titanium compounds having one π-electronic coordinating ligand described above are particularly preferable.

As the titanium compound, condensed titanium compounds represented by general formula (IV):

(IV)

[wherein $R^5$ and $R^6$ represent each a halogen atom, an alkoxy group having 1 to 20 carbon atoms, an acyloxy group, an amide group, or amino group] may also be used. The titanium compound described above may also be used as a complex with an ester, an ether, or phosphine.

Examples of the trivalent titanium compound represented by general formula (II) described above typically include titanium trihalides, such as titanium trichloride and the like, and cyclopentadienyltitanium compounds, such as cyclopentadienyltitanium dichloride and the like, as well as compounds obtained by reduction of tetravalent titanium compounds. The trivalent titanium compound may also be used as a complex with an ester, an ether, or phosphine.

Examples of the zirconium compound used as the transition metal compound include tetrabenzylzirconium, zirconium tetraethoxide, zirconium tetrabutoxide, bisindenylzirconium dichloride, triisopropoxyzirconium chloride, zirconium benzyl dichloride, tributoxyzirconium chloride, and the like. Examples of the hafnium compound include tetrabenzylhafnium, hafnium tetraethoxide, hafnium tetrabutoxide, and the like. Examples of the vanadium compound include vanadyl bisacetylacetonate, vanadyl triacetylacetonate, triethoxyvanadyl, tripropoxyvanadyl, and the like. Among these transition metal compounds, titanium compounds are particularly preferable.

As the transition metal compound of component (a), transition metal compounds having two ligands having conjugated π-electrons can also be used. For example, at least one compound selected from the group consisting of transition metal compounds represented by general formula (V):

[wherein $M^1$ represents titanium, zirconium, or hafnium; $R^7$ and $R^8$ represent each cyclopentadienyl group, a substituted cyclopentadienyl group, indenyl group, or fluorenyl group; $R^9$ and $R^{10}$ represent each hydrogen, a halogen, a hydrocarbon group having 1 to 20 carbon atoms, an alkoxy group having 1 to 20 carbon atoms, amino group, or a thioalkoxy group having 1 to 20 carbon atoms; and $R^{12}$ and $R^{13}$ may be crosslinked with a hydrocarbon group having 1 to 5 carbon atoms, an alkylsilyl group having 1 to 20 carbon atoms and 1 to 5 silicon atoms, or a hydrocarbon group containing germanium which has 1 to 20 carbon atoms and 1 to 5 germanium atoms] can be used.

$R^7$ and $R^8$ in general formula (V) represents cyclopentadienyl group, a substituted cyclopentadienyl group (specifically, methylcyclopentadienyl group, 1,3-dimethylcyclopentadienyl group, 1,2,4-trimethylcyclopentadienyl group, 1,2,3,4-tetramethylcyclopentadienyl group, pentamethylcyclopentadienyl group, trimethylsilylcyclopentadienyl group, 1,3-di(trimethylsilyl)cyclopentadienyl group, 1,2,4-tri(trimethylsilyl)cyclopentadienyl group, tertiary-butylcyclopentadienyl group, 1,3-di(tertiary-butyl) cyclopentadienyl group, 1,2,4-tri(tertiary-butyl) cyclopentadienyl group, or the like), indenyl group, a substituted indenyl group (specifically, methylindenyl group, dimethylindenyl group, trimethylindenyl group, or the like), fluorenyl group, or a substituted fluorenyl group (such as methylfluorenyl group). $R^7$ and $R^8$ may be the same or different. $R^7$ and $R^8$ may represent a structure crosslinked with an alkylidene group having 1 to 5 carbon atoms (specifically, methine group, ethylidene group, propylidene group, dimethylcarbyl group, or the like) or an alkylsilyl group having 1 to 20 carbon atoms and 1 to 5 silicon atoms (specifically, dimethylsilyl group, diethylsilyl group, dibenzylsilyl group, or the like). $R^9$ and $R^{10}$ are as defined above. In more detail, $R^9$ and $R^{10}$ represent each independently hydrogen atom, an alkyl group having 1 to 20 carbon atoms (specifically, methyl group, ethyl group, propyl group, n-butyl group, isobutyl group, amyl group, isoamyl group, octyl group, 2-ethylhexyl group, or the like), an aryl group having 6 to 20 carbon atoms (specifically, phenyl group, naphthyl group, or the like), an arylalkyl group having 7 to 20 carbon atoms (specifically, benzyl group or the like), an alkoxy group having 1 to 20 carbon atoms (specifically, methoxy group, ethoxy group, propoxy group, butoxy group, amyloxy group, hexyloxyl group, octyloxy group, 2-ethylhexyloxy group, or the like), an aryloxy group having 6 to 20 carbon atoms (specifically, phenoxy group or the like), amino group, or a thioalkoxy group having 1 to 20 carbon atoms.

Specific examples of the transition metal compounds represented by general formula (V) include biscyclopentadienyltitanium dimethyl, biscyclopentadienyltitanium diethyl, biscyclopentadienyltitanium dipropyl, biscyclopentadienyltitanium dibutyl, bis(methylcyclopentadienyl) titanium dimethyl, bis(tertiary-butylcyclopentadienyl) titanium dimethyl, bis(1,3-dimethylcyclopentadienyl) titanium dimethyl, bis(1,3-di-tertiary-butylcyclopentadienyl)titanium dimethyl, bis(1,2,4-trimethylcyclopentadienyl)titanium dimethyl, bis(1,2,3,4-tetramethylcyclopentadienyl)titanium dimethyl, bispentamethylcyclopentadienyltitanium dimethyl, bis(trimethylsilylcyclopentadienyl)titanium dimethyl, bis(1,3-di(trimethylsilyl)cyclopentadienyl)titanium dimethyl, bis(1,2,4-tri((trimethylsilyl)cyclopentadienyl)titanium dimethyl, bisindenyltitanium dimethyl, bisfluorenyltitanium dimethyl, methylenebiscyclopentadienyltitanium dimethyl, ethylidenebiscyclopentadienyltitanium dimethyl, methylenebis (2,3,4,5-tetramethylcyclopentadienyl)titanium dimethyl, ethylidenebis(2,3,4,5-tetramethylcyclopentadienyl)titanium dimethyl, dimethylsilylbis(2,3,4,5-tetramethylcyclopentadienyl)titanium dimethyl, methylenebisdenyltitanium dimethyl, ethylidenebisindenyltitanium dimethyl, dimethylsilylbisindenyltitanium dimethyl, methylenebisfluorenyltitanium dimethyl, ethylidenebisfluorenyltitanium dimethyl, dimethylsilylbisfluorenyltitanium dimethyl, methylene(tertiary-butylcyclopentadienyl) (cyclopentadienyl)titanium dimethyl, methylene (cyclopentadienyl)(indenyl)titanium dimethyl, ethylidene (cyclopentadienyl)(indenyl)titanium dimethyl, dimethylsilyl (cyclopentadienyl)(indenyl)titanium dimethyl, methylene (cyclopentadienyl)(fluorenyl)titanium dimethyl, ethylidene (cyclopentadienyl)(fluorenyl)titanium dimethyl, dimethylsilyl(cyclopentadienyl)(fluorenyl)titanium dimethyl, methylene(indenyl)(fluorenyl)titanium dimethyl, ethylidene(indenyl)(fluorenyl)titanium dimethyl, dimethylsilyl(indenyl)(fluorenyl)titanium dimethyl, biscyclopentadienyltitanium dibenzyl, bis(tertiary-butylcyclopentadienyl)titanium dibenzyl, bis(methylcyclopentadienyl)titanium dibenzyl, bis(1,3-dimethylcyclopentadienyl)titanium dibenzyl, bis(1,2,4-trimethylcyclopentadienyl)titanium dibenzyl, bis(1,2,3,4-tetramethylcyclopentadienyl)titanium dibenzyl, bispentamethylcyclopentadienyltitanium dibenzyl, bis(trimethylsilylcyclopentadienyl)titanium dibenzyl, bis(1,3-di-(trimethylsilyl)cyclopentadienyl)titanium dibenzyl, bis(1,2,4-tri(trimethylsilyl)cyclopentadienyl)titanium dibenzyl, bisindenyltitanium dibenzyl, bisfluorenyltitanium dibenzyl, methylenebiscyclopentadienyltitanium dibenzyl, ethylidenebiscyclopentadienyltitanium dibenzyl, methylenebis(2,3,4,5-tetramethylcyclopentadienyl)titanium dibenzyl, ethylidenebis(2,3,4,5-tetramethylcyclopentadienyl)titanium dibenzyl, dimethylsilylbis(2,3,4,5-tetramethylcyclopentadienyl)titanium dibenzyl, methylenebisindenyltitanium dibenzyl, ethylidenebisindenyltitanium dibenzyl, dimethylsilylbisindenyltitanium dibenzyl, methylenebisfluorenyltitanium dibenzyl, ethylidenebisfluorenyltitanium dibenzyl, dimethylsilylbisfluorenyltitanium dibenzyl, methylene(cyclopentadienyl)(indenyl)titanium dibenzyl, ethylidene(cyclopentadienyl)(indenyl)titanium dibenzyl, dimethylsilyl(cyclopentadienyl)(indenyl)titanium dibenzyl, methylene(cyclopentadienyl)(fluorenyl)titanium dibenzyl, ethylidene(cyclopentadienyl)(fluorenyl)titanium dibenzyl, dimethylsilyl(cyclopentadienyl)(fluorenyl) titanium dibenzyl, methylene(indenyl)(fluorenyl)titanium dibenzyl, ethylidene(indenyl)(fluorenyl)titanium dibenzyl, dimethylsilyl(indenyl)(fluorenyl)titanium dibenzyl, biscyclopentadienyltitanium dimethoxide, biscyclopentadienyltitanium diethoxide, biscyclopentadienyltitanium dipropoxide, biscyclopentadienyltitanium dibutoxide, biscyclopentadienyltitanium diphenoxide, bis(methylcyclopentadienyl)titanium dimethoxide, bis(1,3-dimethylcyclopentadienyl)titanium dimethoxide, bis(1,2,4-trimethylcyclopentadienyl)titanium dimethoxide, bis( 1,2,3,4-tetramethylcyclopentadienyl)titanium dimethoxide, bispentamethylcyclopentadienyltitanium dimethoxide, bis(trimethylsilylcyclopentadienyl)titanium dimethoxide, bis(1,3-di-(trimethylsilyl)cyclopentadienyl)titanium dimethoxide, bis(1,2,4-tri(trimethylsilyl)cyclopentadienyl) titanium dimethoxide, bisindenyltitanium dimethoxide, bisfluorenyltitanium dimethoxide, methylenebiscyclopentadienyltitanium dimethoxide, ethylidenebiscyclopentadienyltitanium dimethoxide, methylenebis(2,3,4,5-tetramethylcyclopentadienyl) titanium dimethoxide, ethylidenebis(2,3,4,5-tetramethylcyclopentadienyl)titanium dimethoxide, dimethylsilylbis(2,3,4,5-tetramethylcyclopentadienyl) titanium dimethoxide, methylenebisindenyltitanium dimethoxide, methylenbis(methylindenyl)titanium dimethoxide, ethylidenebisindenyltitanium dimethoxide, dimethylsilylbisindenyltitanium dimethoxide, methylenebisfluorenyltitanium dimethoxide, ethylidenebisfluorenyltitaum dimethoxide, dimethylsilylbisfluorenyltitanium dimethoxide, methylene(cyclopentadienyl)(indenyl) titanium dimethoxide, ethylidene(cyclopentadienyl) (indenyl)titanium dimethoxide, dimethylsilyl (cyclopentadienyl)(indenyl)titanium dimethoxide, methylene(cyclopentadienyl)(fluorenyl)titanium dimethoxide, ethylidene(cyclopentadienyl)(fluorenyl) titanium dimethoxide, dimethylsilyl(cyclopentadienyl) (fluorenyl)titanium dimethoxide, methylene(indenyl) (fluorenyl)titanium dimethoxide, ethylidene(indenyl) (fluorenyl)titanium dimethoxide, dimethylsilyl(indenyl) (fluorenyl)titanium dimethoxide, isopropylidene (cyclopentadienyl)(fluorenyl)titanium dichloride, isopropylidene(cyclopentadienyl)(fluorenyl)titanium dimethoxide, and the like.

Examples of the zirconium compound include ethylidenebiscyclopentadienylzirconium dichloride, ethylidenebiscyclopentadienylzirconium dimethoxide, dimethylsilylbiscyclopentadienylzirconium dimethoxide, isopropylidene(cyclopentadienyl)(fluorenyl)zirconium dichloride, and the like. Examples of the hafnium compound include ethylidenebiscyclopentadienylhafnium dimethoxide, dimethylsilylbiscyclopentadienylhafnium dimethoxide, and the like. Among these compounds, the titanium compounds are particularly preferable.

As the transition metal compound, combinations of the compounds described above and bidentate coordinated complex compounds, such as 2,2'-thiobis(4-methyl-6-t-butylphenoxy)titanium diisopropoxide, 2,2'-thiobis(4-methyl-6-t-butylphenoxy)titanium dimethoxide, and the like, may also be used.

As the coordinated complex compound comprising a cation and an anion having a plurality of groups bonded to a metal which is used as component (b) of the catalyst, various compounds can be used. For example, compounds represented by general formula (VI) or (VII) can advantageously be used:

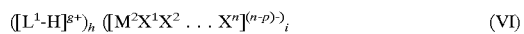  (VI)

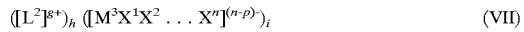  (VII)

(wherein $L^2$ represents $M^4$, $T^1T^2M^5$, or $T^3{}_3C$ which are described below) [in general formulae (VI) and (VII), $L^1$ represents a Lewis base; $M^2$ and $M^3$ represent each a metal selected from Groups 5 to 15 of the Periodic Table; $M^4$ represents a metal selected from Groups 8 to 12 of the Periodic Table; $M^5$ is a metal selected from Groups 8 to 10 of the Periodic Table; $X^1$ to $X^n$ represent each hydrogen atom, a dialkylamino group, an alkoxy group, an aryloxy group, an alkyl group having 1 to 20 carbon atoms, an aryl group, an alkylaryl group, or an arylalkyl group having 6 to 20 carbon atoms, a substituted alkyl group, a substituted aryl group, an organometalloid group, or a halogen atom; $T^1$ and $T^2$ represent each cyclopentadienyl group, a substituted cyclopentadienyl group, indenyl group, or fluorenyl group; $T^3$ represents an alkyl group; p represents the valency of $M^2$ or $M^3$ which is an integer of 1 to 7; n represents an integer of 2 to 8; g represents the ionic valence of $L^1$-H or $L^2$ which is an integer of 1 to 7; h represents an integer of 1 or more; and i=hxg/(n-p)].

Specific examples of $M^2$ and $M^3$ include B, Al, Si, P, As, Sb, and the like. Specific examples of $M^4$ include Ag, Cu, and the like. Specific examples of $M^5$ include Fe, Co, Ni, and the like. Specific examples of $X^1$ to $X^n$ include dialkylamino groups, such as dimethylamino group and diethylamino group; alkoxy groups, such as methoxy group, ethoxy group, and n-butoxy group; aryloxy groups, such as phenoxy group, 2,6-dimethylphenoxy group, and naphthyloxy group; alkyl groups having 1 to 20 carbon atoms, such as methyl group, ethyl group, n-propyl group, isopropyl group, n-butyl group, n-octyl group, and 2-ethylhexyl group; aryl groups, an alkylaryl group, and arylalkyl group having 6 to 20 carbon atoms, such as phenyl group, p-tolyl group, benzyl group, pentafluorophenyl group, 3,5-di (trifluoromethyl)phenyl group, 4-tertiarybutylphenyl group, 2,6-dimethylphenyl group, 3,5-dimethylphenyl group, 2,4-dimethylphenyl group, and 1,2-dimethylphenyl group; halogens, such as F, Cl, Br, and I; and organometalloid groups, such as pentamethylantimony group, trimethylsilyl group, trimethylgermyl group, diphenylarsine group, dicyclohexylantimony group, and diphenylboron group. Specific examples of the substituted cyclopentadienyl group represented by $T^1$ or $T^2$ include methylcyclopentadienyl group, butylcyclopentadienyl group, and pentamethylcyclopentadienyl group.

Among the compounds represented by general formulae (VI) and (VII), specifically, the following compounds can advantageously be used. Examples of the compound represented by general formula (VI) include triethylammonium tetraphenylborate, tri(n-butyl)ammonium tetraphenylborate, trimethylammonium tetraphenylborate, triethylammonium tetra(pentafluorophenyl)borate, triphenylammonium tetra(pentafluorophenyl)borate, triphenylphosphine tetra(pentafluorophenyl)borate, tri(n-butyl)ammonium tetra(pentafluorophenyl)borate, pyridinium tetra(pentafluorophenyl)borate, pyrrolinium tetra(pentafluorophenyl)borate, N,N-dimethylanilinium tetra(pentafluorophenyl)borate, methyldiphenylammonium tetra(pentafluorophenyl)borate, triethylammonium hexafluoroarsinate, and the like. Examples of the compound represented by general formula (VII) include ferrocenium tetraphenylborate, dimethylferrocenium tetra(pentafluorophenyl)borate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, silver tetraphenylborate, silver tetra(pentafluorophenyl)borate, trityl tetraphenylborate, trityl tetra(pentafluorophenyl)borate, silver hexafluoroarsinate, silver hexafluoroantimonate, silver tetrafluoroborate, triphenylcarbenium tetra(pentafluorophenyl)borate, tetramethyl quaternaryammonium tetra(pentafluorophenyl)borate, N-methyl quaternarypyridinium tetra(pentafluorophenyl) borate, and the like.

As component (b), aluminoxanes and oxygen-containing compounds having the Al—O—Si bond, the Al—O—B bond, or the like can also be used as well as the above coordinated compound comprising a cation and an anion having a plurality of groups bonded to a metal. Examples of the aluminoxane and the oxygen-containing compound include compounds represented by general formulae (IX) and/or (X):

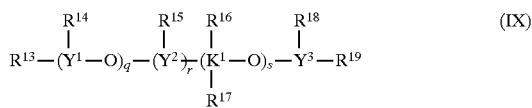

[In the above formula, $R^{13}$ to $R^{19}$ represent each a hydrocarbon group having 1 to 10 carbon atoms, hydrogen, a halogen, siloxy group, a siloxy group substituted with alkyl groups, an alkylamide, an arylamide, or an alkoxy group and may be the same with each other or different from each other; $Y^1$ to $Y^3$ represent each an element of Group 13 or an element of Group 15 of the Periodic Table and may the same with each other or different from each other; $K^1$ represents an element of Group 14 of the Periodic Table; q, r, and s represent each a number of 0 to 50; and the sum of q, r, and s is 1 or more.]

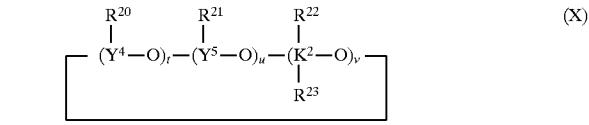

[In the above formula, $R^{20}$ to $R^{23}$ represent each a hydrocarbon group having 1 to 10 carbon atoms, hydrogen, a halogen, siloxy group, a siloxy group substituted with alkyl groups, an alkylamide, an arylamide, or an alkoxy group and may be the same with each other or different from each other; $Y^4$ and $Y^5$ represent each an element of Group 13 or an element of Group 15 of the Periodic Table and may the same or different; $K^2$ represents an element of Group 14 of the Periodic Table; t, u, and v represent each a number of 0 to 50; and the sum of t, u, and v is 1 or more.]

In general formulae (IX) and (X) described above, $R^{13}$ to $R^{23}$ specifically represent each methyl group, ethyl group, n-butyl group, n-propyl group, isopropyl group, isobutyl group, pentyl group, hexyl group, heptyl group, octyl group, phenyl group, pentafluorophenyl group, hydrogen, fluorine, chlorine, trimethylsilyl group, trimethylsiloxy group, hydroxyl group, methoxy group, isobutylalkoxy group, dimethylamino group, phenylmethylamino group, N-(1,6-di-t-butylphenyl)-N'-trimethylsilylamino group, or the like. $R^{13}$ to $R^{19}$ may be the same with each other or different from each other. $R^{20}$ to $R^{23}$ may be the same with each other or different from each other.

In general formulae (IX) and (X) described above, $Y^1$ to $Y^5$ represent each an element of Group 13 or an element of Group 15 of the Periodic Table. Specific examples of the element of Group 13 include boron (B), aluminum (Al), gallium (Ga), indium (In), and thallium (Tl). Boron and aluminum are preferable among these elements. Specific examples of the element of Group 15 include nitrogen (N) and phosphorus (p). $Y^1$ to $Y^3$ may be the same with each other or different from each other. $Y^4$ and $Y^5$ may be the same or different.

In general formulae (IX) and (X) described above, $K^1$ and $K^2$ represent each an element of Group 14 of the Periodic Table. Specific examples of the element of Group 14 include carbon (C), silicon (Si), germanium (Ge), tin (Sn), and lead (Pb). Carbon, silicon, and germanium are preferable among these elements. $K^1$ and $K^2$ may be the same or different.

In general formulae (IX) and (X) described above, q to v represent each an integer of 0 to 50, and the sum of q, r, and s and the sum of t, u, and v are each 1 or more. q to v preferably represent each an integer in the range of 1 to 30, more preferably in the range of 1 to 20.

As the oxygen-containing compound which is represented by general formulae (IX) and (X) described above, reaction products of organoaluminum compounds and water are advantageously be used. The reaction products of organoaluminum compounds and water mainly include alkylaluminoxanes having a chain structure represented by general formula (XI):

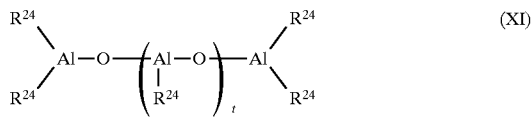

(wherein t represents the degree of polymerization which is a number of 2 to 50, and $R^{24}$ represents an alkyl group having 1 to 8 carbon atoms) and alkylaluminoxanes having a ring structure represented by general formula (XII):

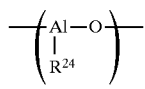 (XII)

(wherein $R^{24}$ is the same as that described in the above). Among these alkylaluminoxanes, compounds represented by the above formulae in which $R^{24}$ represents methyl group, i.e. methylaluminoxanes, are preferable.

As the organoaluminum compound which is brought into reaction with water, a trialkylaluminum represented by general formula (XIII):

$$Al\ R^{24}{}_3 \qquad (XIII)$$

(wherein $R^{24}$ is the same as that described in the above), specifically trimethylaluminum, triethylaluminum, triisobutylaluminum, or the like, is generally used. Among these compounds, trimethylaluminum is preferable.

The reaction product of the trialkylaluminum and water generally contains the alkylaluminoxanes having a chain structure and the alkylaluminoxanes having a ring structure both described above as the main components thereof, and further contains the unreacted trialkylaluminum, various types of condensation products, and molecules formed by association of these compounds in a complicated manner. Therefore, various types of reaction product are obtained depending on the condition under which the trialkylaluminum is brought into contact with water. The method of bringing the trialkylaluminum into the reaction with water is not particularly limited, and a conventional method can be used.

In the present invention, a single type or a combination of two or more types of the oxygen-containing compound of component (b) can be used. As component (b), one or more types of the coordinated complex compound described above and one or more types of the aluminoxane or the aluminum compound containing oxygen can be used in combination.

Among the compounds used in combination, for example, compounds described in the specifications of Japanese Patent Application Laid-Open No. Heisei 6(1994)-172438 and Japanese Patent Application Laid-Open No. Heisei 6(1994)-172439 can be used as the oxygen-containing compound containing both aluminum and boron, and compounds described in Angew. Chem. Int. Ed. Engl. (1994), 33, No. 20, 2103 can be used as the oxygen-containing compound containing both aluminum and silicon.

The catalyst of the present invention further comprises a compound containing alkyl groups as component (c).

As the compound containing alkyl groups, various compounds can be used. Examples of such compound include aluminum compounds containing alkyl groups represented by general formula (XIV):

$$R^{25}{}_m Al(OR^{26})_n X_{3-m-n} \qquad (XIV)$$

(wherein $R^{25}$ and $R^{26}$ represent each an alkyl group having 1 to 8 carbon atoms, preferably 1 to 4 carbon atoms, X represents hydrogen or a halogen, m represents a number in the range of $0 \leq m \leq 3$, preferably 2 or 3, more preferably 3, and n represents a number in the range of $0 \leq n \leq 3$, preferably 0 or 1); alkylmagnesium compounds containing alkyl groups represented by general formula (XV):

$$R^{25}{}_2 Mg \qquad (XV)$$

(wherein $R^{25}$ is the same as that described above); and zinc compounds containing alkyl groups represented by general formula (XVI):

$$R^{25}{}_2 Zn \qquad (XVI)$$

(wherein $R^{25}$ is the same as that described above).

Among these compounds containing alkyl groups, aluminum compounds containing alkyl groups are preferable, and trialkylaluminums and dialkylaluminum compounds are particularly preferable. Specific examples of the preferable compound include trialkylaluminums, such as trimethylaluminum, triethylaluminum, tri-n-propylaluminum, triisopropylaluminum, tri-n-butylaluminum, triisobutylaluminum, tri-t-butylaluminum, and the like; dialkylaluminum halides, such as dimethylaluminum chloride, diethylaluminum chloride, di-n-propylaluminum chloride, diisopropylaluminum chloride, di-n-butylaluminum chloride, diisobutylaluminum chloride, di-t-butylaluminum chloride, and the like; dialkylaluminum alkoxides, such as dimethylaluminum methoxide, dimethylaluminum ethoxide, and the like; and dialkylaluminum hydrides, such as dimethylaluminum hydride, diethylaluminum hydride, diisobuylaluminum hydride, and the like. Further examples include dialkylmagnesiums, such as dimethylmagnesium, diethylmagnesium, di-n-propylmagnesium, diisopropylmagnesium, and the like; and dialkylzincs, such as dimethylzinc, diethylzinc, di-n-propylzinc, diisopropylzinc, and the like.

For producing the styrenic polymer in accordance with the process of the present invention, a styrenic monomer, such as styrene and/or a derivative of styrene (an alkylstyrene, an alkoxystyrene, a halogenated styrene, an ester of vinylbenzoic acid, or the like) is polymerized (or copolymerized) in the presence of the polymerization catalyst comprising component (a), component (b) and component (c) used where necessary as the main components thereof in a polymerization process comprising a plurality of polymerization stages.

In the process of the present invention, hydrogen is introduced in at least one polymerization stage selected as desired from the plurality of polymerization stages as described in the following.

The process of the present invention comprises a plurality of polymerization stages, and hydrogen is introduced in at least one stage selected as desired from these stages. The boundary of a stage from another stage in the plurality of polymerization stages is defined by change in one polymerization condition selected as desired from the set of polymerization conditions of the stage. The polymerization time in the first stage of the polymerization process (the period of time during which the polymerization is maintained) is preferably 20 seconds to 2 hours, more preferably 30 seconds to 1 hour, most preferably 1 minute to 30 minutes. When the polymerization time in the first stage is less than 20 seconds or more than 2 hours, control of the molecular weight and the molecular weight distribution occasionally becomes difficult in either case. In the process in which hydrogen is added, the partial pressure of hydrogen is not particularly limited. The partial pressure of hydrogen is generally 5 MPa or less. The time at which hydrogen is introduced is not particularly limited, and the period of time during which hydrogen is introduced is not particularly limited either.

In the present invention, the molecular weight distribution and the molecular weight of the formed styrenic polymer can be controlled by adjusting the time at which hydrogen is introduced, the period of time during which hydrogen is introduced, the amount of introduced hydrogen, and the partial pressure of hydrogen during the introduction or after the introduction as desired. However, for example, when hydrogen is kept being introduced in a single stage of the polymerization process, low molecular weight components are increased to cause decrease in the excellent heat resistance and molding property of SPS. In the present invention, by introducing hydrogen in at least one stage selected as desired from the plurality of polymerization stages, it is made possible that the molecular weight and the molecular weight distribution are controlled while the formation of low molecular weight components is decreased and the high activity is maintained.

In each stage of the polymerization process of the present invention, the polymerization (or the copolymerization) of a styrenic monomer, such as styrene and/or a derivative of styrene (an alkylstyrene, an alkoxystyrene, a halogenated styrene, an ester of vinylbenzoic acid, or the like), is conducted as described in the following.

In the process of the present invention, the method of using the catalyst is not particularly limited. Therefore, the amounts of the catalyst components, and the ratio between the catalyst components (the used amounts of the catalyst components), i.e. component (a), component (b), and component (c), is decided as desired in accordance with various conditions and not particularly limited. However, when component (b) is the coordinated complex compound described above, the mol ratio of component (a) to component (b) is generally in the range of 1:10 to 10:1. When component (b) is the aluminoxane or the aluminum compound containing oxygen described above, the mol ratio of component (a) to component (b) is generally in the range of 1:1 to 1:10000, preferably in the range of 1:1 to 1:1000. As for component (c), the mol ratio of component (a) to component (c) is generally in the range of 1:0.1 to 1:1000.

The method of preparation of the polymerization catalyst used in the present invention is not particularly limited either, and various methods can be used. For example, when a catalyst composed of components (a), (b), and (c) is prepared, (i) a method in which the catalyst is prepared by adding component (c) to the reaction product of component (a) and component (b), and the monomer for polymerization is brought into contact with the prepared catalyst; (ii) a method in which the catalyst is prepared by adding component (b) to the reaction product of component (a) and component (c), and the monomer for polymerization is brought into contact with the prepared catalyst; (iii) a method in which the catalyst is prepared by adding component (a) to the reaction product of component (b) and component (c), and the monomer for polymerization is brought into contact with the prepared catalyst; or (iv) a method in which components (a), (b), and (c) are separately added to the monomer for polymerization to bring them into contact with each other can be used. Component (c) may be mixed with the reaction product of component (a) and component (b), with the monomer used for the polymerization, or with both of them.

When a catalyst composed of component (a) and component (b) is prepared, (i) a method in which the reaction product of component (a) and component (b) is used as the catalyst, and the monomer for polymerization is brought into contact with the catalyst; (ii) a method in which a mixture of component (a) and component (b) is used as the catalyst, and the monomer for polymerization is brought into contact with the catalyst; or (iii) a method in which component (a) and component (b) are brought into contact with each other by adding separately to the monomer used for the polymerization can be used.

The procedure of adding component (a), component (b), and component (c) which is used where necessary to the monomer for the polymerization and the procedure of bringing the components into contact with each other can, of course, be conducted at the temperature of polymerization. It is also possible that these procedures are conducted at a temperature in the range of −200° to 100° C. The above catalyst of the present invention exhibits a high activity in the production of styrenic polymer having a highly syndiotactic configuration.

For producing a styrenic polymer in accordance with the process of the present invention, styrenic monomers, such as styrene and/or a derivative of styrene, are homopolymerized or copolymerized or a styrenic monomer and an olefin and/or a diene compound are copolymerized in the presence of a polymerization catalyst for SPS, preferably in the presence of the above catalyst comprising component (a), component (b), and component (c) which is used where necessary. In the present invention, when a gaseous monomer is used, the partial pressure of the gaseous monomer is generally 5 MPa (50 atm) or less, preferably 3 MPa or less.

As the styrenic monomer, a compound represented by general formula (XVII):

(wherein $R^{27}$ represents hydrogen atom, a halogen atom, or a hydrocarbon group having 20 or less carbon atoms; and m represents an integer of 1 to 3; when m represents 2 or more, the plurality of $R^{27}$ may be the same with each other or different from each other) is preferably used. Examples of the above compound include styrene; alkylstyrenes, such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene, p-tertiary-butylstyrene, and the like; polyvinylbenzenes, such as p-divinylbenzene, m-divinylbenzene, trivinylbenzene, and the like; halogenated styrenes, such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, and the like; alkoxystyrenes, such as methoxystyrene, ethoxystyrene, t-butoxystyrene, and the like; and mixtures of two or more types of the above compound.

Examples of the olefin which is copolymerized with the above styrenic monomer include α-olefins, such as propylene, butene-1, pentene-1, hexene-1, heptene-1, octene-1, nonene-1, decene-1, 4-phenylbutene-1, 6-phenylhexene-1, 3-methylbutene-1, 4-methylpentene-1, 3-methylpentene-1, 3-methylhexene-1, 4-methylhexene-1, 5-methylhexene-1, 3,3-dimethylpentene-1, 3,4-dimethylpentene-1, 4,4-dimethylpentene-1, vinylcyclohexane, and the like; α-olefins substituted with a halogen, such as hexafluoropropene, tetrafluoroethylene, 2-fluoropropene, fluoroethylene, 1, 1-difluoroethylene, 3-fluoropropene, trifluoroethylene, 3,4-dichlorobutene-1, and the like; and cyclic olefins, such as cyclopentene, cyclohexene, norbornene, 5-methylnorbornene, 5-ethylnorbornene, 5-propylnorbornene, 5,6- dimethylnorbornene, 1-methylnorbornene, 7-methylnorbornene, 5,5,6-trimethylnorbornene, 5-phenylnorbornene, 5-benzylnorbornene, and the like. Examples of the diene compound include diene compounds having a chain structure, such as butadiene, isoprene, 1,6-hexadiene, and the like; and diene compounds having a cyclic structure, such as norbornadiene, 5-ethylidenenorbornene, 5-vinylnorbornene, dicylopentadiene, and the like. A single type or a combination of two or more types of the above olefin may be used.

In the present invention, component (a), component (b), and component (c) which is used where necessary may be added separately to the monomer. Alternatively, component (a), component (b), and component (c) which is used where necessary may be preliminarily mixed with a solvent (for example, an aromatic hydrocarbon, such as toluene, ethylbenzene, or the like, or an aliphatic hydrocarbon, such as hexane, heptane, or the like) before the catalyst components are mixed with the monomer. The whole amount or a part of component (c) described above may also be added to the monomer.

The polymerization of the styrenic monomer may be conducted in bulk or in a solvent, such as an aliphatic hydrocarbon such as pentane, hexane, heptane, or the like, an alicyclic hydrocarbon such as cyclohexane or the like, or an aromatic hydrocarbon such as benzene, toluene, xylene, or the like. The polymerization temperature is not particularly limited and generally in the range of 20° to 120° C., preferably in the range 20° to 100° C.

As the mode of the polymerization, various modes of polymerization, such as the bulk polymerization, the solution polymerization, the gas phase polymerization, the melt polymerization, the continuous polymerization, the batch polymerization, and the like, can be used.

Other components may also be used as desired in addition to components (a), (b), and (c) of the catalyst within the range that the advantages of the present invention are not adversely affected. Examples of the other component include compounds containing an active hydrogen, such as $H_2O$, methanol, ethanol, butanol, and the like; electron-donating compounds, such as ethers, esters, amines, and the like; phenyl borate; phenyl phosphite; compounds containing an alkoxy group, such as tetraethoxysilane, diphenyldiethoxyborane, and the like; and organoboron compounds, such as triethylborane, triphenylborane, tris (pentafluorophenyl)borane, and the like.

The styrenic polymer obtained as described in the above has the syndiotactic configuration. The syndiotactic configuration of the styrenic polymer obtained above means that the stereochemical structure has a highly syndiotactic configuration. In other words, phenyl groups and substituted phenyl groups of the side groups are alternately placed at the opposite positions with respect to the main chain formed with the carbon-carbon bonds. The tacticity in the stereochemical structure is quantitated by the measurement of the nuclear magnetic resonance using an isotope of carbon ($^{13}$C-NMR). The tacticity measured by the $^{13}$C-NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. In the present invention, "the styrenic polymer having the syndiotactic configuration" means polystyrene, a poly(alkylstyrene), a poly(halogenated styrene), a poly(alkoxystyrene), a poly(vinylbenzoic acid ester), a mixture of these polymers, or a copolymer containing constituting units of these polymers as the main components, which generally has a syndiotacticity of 75% or more, preferably 85% or more, expressed in terms of the content of the racemic diad, or 30% or more, preferably 50% or more, expressed in terms of the content of the racemic pentad. Examples of the poly(alkylstyrene) include poly (methylstyrene), poly(ethylstyrene), poly(isopropylstyrene), poly(tertiary-butylstyrene), and the like. Examples of the poly(halogenated styrene) include poly(chlorostyrene), poly (bromostyrene), poly(fluorostyrene), and the like. Examples of the poly(alkoxystyrene) include poly(methoxystyrene), poly(ethoxystyrene), and the like. Particularly preferable examples of the styrenic polymers described above include polystyrene, poly(p-methylstyrene), Poly(m-methylstyrene), poly(p-tertiary-butylstyrene), poly(p-chlorostyrene), poly(m-chlorostyrene), poly(p-fluorostyrene), and a copolymer of styrene and p-methylstyrene.

The styrenic polymer obtained in accordance with the process of the present invention generally has a weight-average molecular weight of 10,000 to 3,000,000, preferably 50,000 to 1,500,000, a number-average molecular weight of 5,000 to 1,500,000, preferably 50,000 to 1,000,000, and the high degree of syndiotacticity described above. As for the molecular weight distribution and the $M_n/5$ fraction of the polymer obtained in accordance with the present invention, a styrenic polymer generally having an $M_w/M_n$ of 4 or more and an $M_n/5$ fraction of 25% or less, preferably having an $M_w/M_n$ of 6 or more and an $M_n/5$ fraction of 20% or less, can be obtained. In the above description, the $M_n/5$ fraction means the content of polymer components having a molecular weight smaller than the value which is obtained by dividing the number-average molecular weight ($M_n$) of the obtained polymer by 5 in the polymer.

In the present invention, a high purity styrenic polymer having an extremely high syndiotacticity can be obtained when the styrenic polymer obtained after the polymerization is treated with a washing fluid containing hydrochloric acid or the like for deashing where necessary, washed, dried under a vacuum, and washed with a solvent, such as methyl ethyl ketone or the like, to remove soluble fractions, and the obtained insoluble fraction is further treated with chloroform or the like.

The styrenic polymer having the syndiotactic configuration has a melting point of 160° to 310° C. and is remarkably superior in the heat resistance to that of conventional styrenic polymers having the atactic configuration.

The present invention is described more specifically with reference to examples. The present invention is not limited by these examples.

EXAMPLE 1

(1) Method for preparation of a mixed catalyst

Under an atmosphere of nitrogen, 2.4 mmol of triisobutylaluminum (TIBA), 96 mg of dimethylanilinium tetra (pentaflurophenyl)borate ([PhNMe$_2$H][B(C$_6$F$_5$)$_4$]), and 0.12 mmol of pentamethylcyclopentadienyltitanium trimethoxide (($C_5$(CH$_3$)$_5$)Ti(OMe)$_3$) were added to 38.3 ml of toluene, and the total amount was adjusted to 40 ml.

(2) Preparation of polystyrene

Under an atmosphere of nitrogen, a reactor having an inner volume of 1 liter was charged with 200 ml of styrene and 0.08 mmol of triethylaluminum (TEA). After the temperature of the mixture was set at 70° C., hydrogen was supplied to the reactor until the partial pressure reached 0.1 MPa. Then, 1.25 ml of the mixed catalyst prepared in (1)

was added to the above mixture, and the polymerization was allowed to proceed for 30 minutes. Thereafter, the partial pressure of hydrogen was changed to 0.01 MPa, and the polymerization was allowed to proceed for 3 hours and 30 minutes. As the result, 35.3 g of a syndiotactic polystyrene (SPS) having a weight-average molecular weight ($M_w$) of 230,000, and a molecular weight distribution (the weight-average molecular weight $M_w$/the number-average molecular weight $M_n$) of 10.1 was obtained. The activity was 197.4 kg/g Ti. The $M_n/5$ fraction which shows the content of low molecular weight components in the obtained polymer (components having a molecular weight smaller than the value which is obtained by dividing $M_n$ by 5) was 15%.

The results are shown in Table 1.

EXAMPLE 2

Under an atmosphere of nitrogen, a reactor having an inner volume of 1 liter was charged with 200 ml of styrene and 0.08 mmol of triethylaluminum (TEA). After the temperature of the mixture was set at 70° C., 1.25 ml of the mixed catalyst prepared in Example 1 (1) was added to the above mixture, and the polymerization was allowed to start. When 1 minute passed after the start of the polymerization, hydrogen was added until the partial pressure of hydrogen reached 0.1 MPa, and the polymerization was allowed to proceed for 1 hour. As the result, 18.1 g of SPS having a weight-average molecular weight ($M_w$) of 73,000, and a molecular weight distribution (the weight-average molecular weight/the number-average molecular weight) of 11.7 was obtained. The activity was 101.2 kg/g Ti. The $M_n/5$ fraction was 20%.

The results are shown in Table 1.

COMPARATIVE EXAMPLE 1

The same procedures as those conducted in Example 2 were conducted except that hydrogen was not supplied to the reaction system, and 14.5 g of SPS having a weight-average molecular weight of 870,000 and a molecular weight distribution of 2.9 was obtained. The activity was 81 kg/g Ti, and the $M_n/5$ fraction was 14%.

The results are shown in Table 1.

EXAMPLE 3

Under an atmosphere of nitrogen, a reactor having an inner volume of 1 liter was charged with 200 ml of toluene, 200 ml of styrene, and 0.08 mmol of triisobutylaluminum (TIBA). After the temperature of the mixture was set at 70° C., 2.49 ml of the mixed catalyst prepared in Example 1 (1) was added to the above mixture, and the polymerization was allowed to start. When 1 minute passed after the start of the polymerization, hydrogen was added until the partial pressure of hydrogen reached 0.1 MPa, and the polymerization was allowed to proceed for 0.5 hours. As the result, 25.3 g of SPS having a weight-average molecular weight ($M_w$) of 150,000, and a molecular weight distribution (the weight-average molecular weight/the number-average molecular weight) of 14.0 was obtained. The activity was 70.7 kg/g Ti. The $M_n/5$ fraction was 18%.

The results are shown in Table 1.

COMPARATIVE EXAMPLE 2

The same procedures as those conducted in Example 3 were conducted except that hydrogen was not supplied to the reaction system, and 4.3 g of SPS having a weight-average molecular weight of 700,000 and a molecular weight distribution of 2.8 was obtained. The activity was 12.0 kg/g Ti, and the $M_n/5$ fraction was 11%.

The results are shown in Table 1.

EXAMPLE 4

(1) Method for preparation of a mixed catalyst

Under an atmosphere of nitrogen, 3.0 mmol of triisobutylaluminum (TIBA), 9.0 mmol of methylaluminoxane (MAO), and 0.12 mmol of pentamethylcyclopentadienyltitanium trimethoxide (($C_5(CH_3)_5$)Ti(OMe)$_3$) were added to 32.57 ml of toluene, and the total amount was adjusted to 40 ml.

(2) Preparation of polystyrene

Under an atmosphere of nitrogen, a reactor having an inner volume of 1 liter was charged with 200 ml of toluene, 200 ml of styrene, and 0.1 mmol of triisobutylaluminum (TIBA). After the temperature of the mixture was set at 70° C., 0.84 ml of the mixed catalyst prepared in (1) was added to the above mixture, and the polymerization was allowed to start. When 2 minutes passed after the start of the polymerization, hydrogen was added until the partial pressure of hydrogen reached 0.05 MPa, and the polymerization was allowed to proceed for 1 hour. As the result, 77.7 g of SPS having a weight-average molecular weight ($M_w$) of 70,000, and a molecular weight distribution (the weight-average molecular weight / the number-average molecular weight) of 17.0 was obtained. The activity was 652.0 kg/g Ti. The $M_n/5$ fraction was 16%.

The results are shown in Table 1.

COMPARATIVE EXAMPLE 3

The same procedures as those conducted in Example 4, were conducted except that hydrogen was not supplied to the reaction system, and 46.1 g of SPS having a weight-average molecular weight of 1,090,000 and a molecular weight distribution of 2.8 was obtained. The activity was 386.6 kg/g Ti, and the $M_n/5$ fraction was 10%.

The results are shown in Table 1.

COMPARATIVE EXAMPLE 4

The same procedures as those conducted in Example 1 were conducted except that the partial pressure of hydrogen was 0.01 MPa, and the polymerization was allowed to proceed for 4 hours without changing the partial pressure of hydrogen, and 34.4 g of SPS having a weight-average molecular weight of 280,000 and a molecular weight distribution of 10.5 was obtained. The activity was 192.4 kg/g Ti, and the $M_n/5$ fraction was 36%.

The results are shown in Table 1.

TABLE 1

| | amount of supplied hydrogen (MPa) | | con-version % | wt.-av. mol. wt. $M_w$ | mol. wt. distribn. $M_w/M_n$ | $M_n/5$ fraction % |
|---|---|---|---|---|---|---|
| | 1st stage | 2nd stage | | | | |
| Example 1 | 0.1 | 0.01 | 19.5 | 230,000 | 10.1 | 15 |
| Example 2 | 0 | 0.1 | 10 | 73,000 | 11.7 | 20 |
| Comparative Example 1 | 0 | — | 8 | 873,000 | 2.9 | 14 |
| Example 3 | 0 | 0.1 | 14.2 | 150,000 | 14.0 | 18 |
| Comparative Example 2 | 0 | — | 2.4 | 700,000 | 2.8 | 11 |

TABLE 1-continued

|  | amount of supplied hydrogen (MPa) | | con-version % | wt.-av. mol. wt. $M_w$ | mol. wt. distribn. $M_w/M_n$ | Mn/5 fraction % |
|---|---|---|---|---|---|---|
|  | 1st stage | 2nd stage |  |  |  |  |
| Example 4 | 0 | 0.05 | 43 | 70,000 | 17.0 | 16 |
| Comparative Example 3 | 0 | — | 25.5 | 1,090,000 | 2.8 | 10 |
| Comparative Example 4 | 0.01 | — | 19.0 | 280,000 | 10.5 | 36 |

Abbreviations in the table: wt.-av. mol. wt.: weight-average molecular weight; and mol. wt. distribn.: molecular weight distribution.

INDUSTRIAL APPLICABILITY

As described in the above, in accordance with the process of the present invention, efficient control of the molecular weight and the molecular weight distribution of the produced SPS is enabled, and decrease in the production cost is also enabled by decreasing the amount of the catalyst and decreasing the amount of residual metals. Therefore, a styrenic polymer having the syndiotactic configuration can be obtained very efficiently in accordance with the present invention.

We claim:

1. A process for producing a styrenic polymer having a syndiotactic configuration; wherein said process comprises a plurality of polymerization stages, at least one of said polymerization stages being a polymerization stage in which hydrogen is introduced, and wherein the polymerization time in a first stage of said plurality of polymerization stages is kept at 20 seconds to 2 hours.

2. A process for producing a styrenic polymer according to claim 1 wherein a styrenic monomer is homopolymerized or copolymerized in the presence of a polymerization catalyst comprising (a) a transition metal compound and (b) a coordinated complex compound comprising a cation and an anion having a plurality of groups bonded to a metal or an oxygen-containing compound.

3. A process for producing a styrenic polymer according to claim 1 wherein a styrenic monomer is homopolymerized or copolymerized in the presence of a polymerization catalyst comprising (a) a transition metal compound, (b) a coordinated complex compound comprising a cation and an anion having a plurality of groups bonded to a metal or an oxygen-containing compound, and (c) a compound containing alkyl groups.

* * * * *